Figure 1:
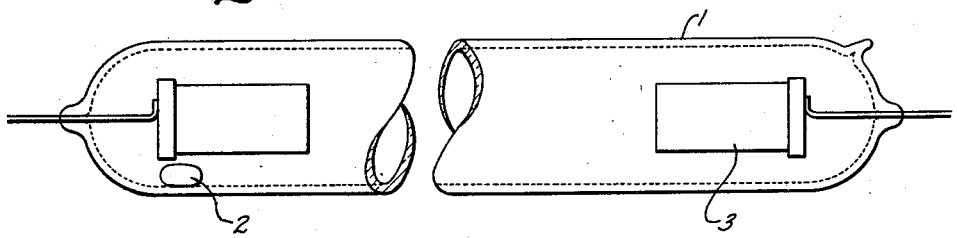

May 26, 1942.  M. HÜNIGER ET AL  2,284,055
LUMINESCENT GLASS
Filed May 17, 1940

Inventors:
Magdalene Hüniger,
Hans Panke,
by John H. Henderson
Their Attorney.

Patented May 26, 1942

2,284,055

UNITED STATES PATENT OFFICE 2,284,055

LUMINESCENT GLASS

Magdalene Hüniger, Berlin-Charlottenburg, and Hans Panke, Berlin, Germany, assignors to General Electric Company, a corporation of New York Application May 17, 1940, Serial No. 335,826
In Germany May 17, 1939

6 Claims. (Cl. 250—81)

The invention relates to luminescent glasses which may be used for the envelopes of electric discharge lamps or luminous valves with filling of rare gas or, if desired, of mercury vapor. This glass transforms the short-wave radiation of the discharge to long-wave rays, so that by suitable selection of the luminescent glass an alteration or improvement of the color of the visible radiation of the discharge is attained. There is very little to choose from the luminescent glasses of yellow, orange or red fluorescence known up to the present and which are especially useful for the color improvement of mercury vapor discharges. Some of these glasses are further naturally colored, such as for instance the yellow luminous glasses, so that hereby their employment is restricted.

It has been ascertained that red, orange or yellow luminescent glasses can be produced, if into phosphate glasses of known composition manganese oxide and the oxide of the trivalent cerium are introduced according to the invention simultaneously as glass bases and in a quantity up to 25% MnO and up to 15% $Ce_2O_3$. Surprisingly beautiful and clearly luminescent glasses are then obtained. According to the proportion of manganese oxide to cerium oxide yellow up to red luminescent glasses are obtained, and the luminescent color becomes redder when more manganese oxide is present and yellower when more cerium oxide is present. The range of concentration, within which the said oxides impart luminescence to phosphate glasses is very large. The glass preparation may contain up to 25% manganese oxide or up to 15% cerium oxide. Generally smaller additions will be sufficient.

Hereinafter some oxidic compositions of the luminescent glasses produced according to the new method will be stated. For comparison the compositions of the phosphate glasses are stated, from which the brightly luminescent phosphate glasses have been produced by the introduction of manganese oxide and cerium oxide.

| Ordinary phosphate glass | |
|---|---|
| $P_2O_5$ | 59.5 |
| $B_2O_3$ | 3.0 |
| BaO | 28.0 |
| $Al_2O_3$ | 8.0 |
| $As_2O_5$ | 1.5 |
| | 100.0 |

| Luminescent glass (shining orange) | |
|---|---|
| $P_2O_5$ | 59.5 |
| $B_2O_3$ | 3.0 |
| BaO | 24.0 |
| MnO | 4.0 |
| $Al_2O_3$ | 6.0 |
| $Ce_2O_3$ | 2.0 |
| $As_2O_5$ | 1.5 |
| | 100.0 |

| Ordinary phosphate glass | |
|---|---|
| $P_2O_5$ | 56.0 |
| $B_2O_3$ | 3.0 |
| BaO | 38.0 |
| $Al_2O_3$ | 1.5 |
| $As_2O_5$ | 1.5 |
| | 100.0 |

| Luminescent glass (shining red-orange) | |
|---|---|
| $P_2O_5$ | 56.0 |
| $B_2O_3$ | 3.0 |
| BaO | 30.0 |
| MnO | 8.0 |
| $Al_2O_3$ | 0.0 |
| $Ce_2O_3$ | 1.5 |
| $As_2O_5$ | 1.5 |
| | 100.0 |

| Ordinary phosphate glass | |
|---|---|
| $P_2O_5$ | 70.5 |
| $B_2O_3$ | 3.0 |
| $K_2O$ | 12.0 |
| MgO | 4.0 |
| $Al_2O_3$ | 10.0 |
| $As_2O_5$ | 0.5 |
| | 100.0 |

| Luminescent glass (shining yellow-orange) | |
|---|---|
| $P_2O_5$ | 70.5 |
| $B_2O_3$ | 3.0 |
| $K_2O$ | 12.0 |
| MgO | 2.0 |
| MnO | 2.0 |
| $Al_2O_3$ | 2.0 |
| $Ce_2O_3$ | 8.0 |
| $As_2O_5$ | 0.5 |
| | 100.0 |

The strongest yield of luminescence is obtained with additions of at the utmost 10% MnO and $Ce_2O_3$. In order that for the obtention of the desired effect the oxide of the trivalent cerium is obtained, and glass must be melted under reducing conditions.

Three types of discharge lamps employing glasses according to the invention are shown by way of example in the accompanying drawing, in which Fig. 1 shows an elongated low pressure luminous valve or lamp, the envelope 1 of which consists of a luminescent phosphate glass containing manganese oxide and cerium oxide and containing a filling of rare gas at a few mm pressure and a little mercury 2. At each end of the luminous valve a glowing electrode is provided heated by the discharge.

Figures 2, 3:
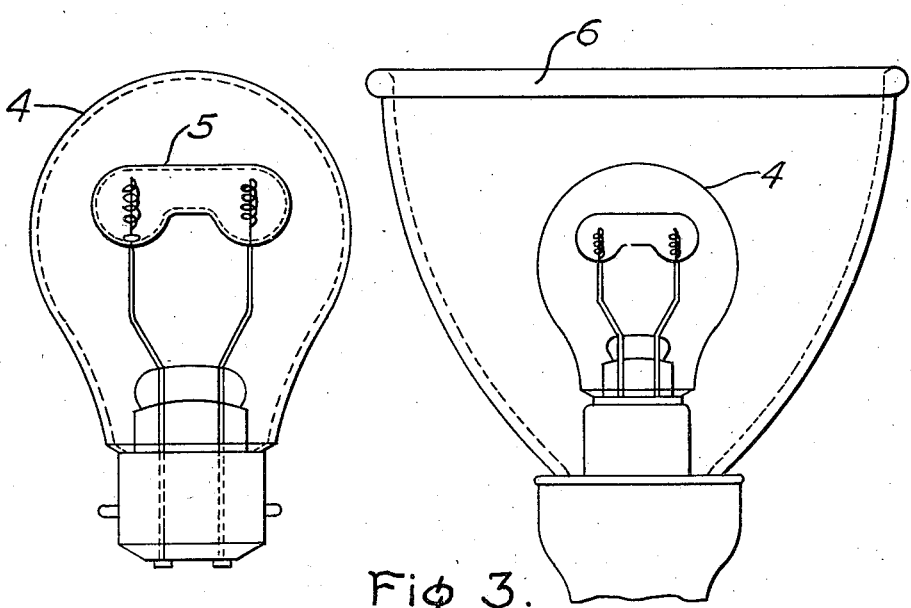

Fig. 2 shows a high pressure discharge lamp, comprising an enveloping vessel 4 with attached base and enclosed mercury high pressure burner 5. The discharge vessel of the high pressure burner 5 consists of quartz glass; and the enveloping vessel 4 of a luminescent phosphate glass containing manganese oxide and cerium oxide.

Fig. 3 shows again a high pressure discharge lamp, in which however the enveloping vessel 4 consists of a clear glass pervious to ultraviolet. On the base of the enveloping vessel 4 is fixed a shade 6 of luminescent phosphate glass which lights by the action of the ultraviolet radiation impinging on the same and besides assists in intensifying the light radiation for the improvement of the color of the light.

We claim:

1. A luminescent phosphate glass emissive in the yellow to red spectral range under irradiation by ultraviolet rays, said glass containing, in addition to the usual ingredients of phosphate glass, up to about 25 per cent manganese oxide and up to about 15 per cent of the oxide of the trivalent cerium.

2. A luminescent phosphate glass emissive in the yellow to red spectral range under irradiation by ultraviolet rays, said glass containing, in addition to the usual ingredients of phosphate glass, 10 per cent manganese oxide and 10 per cent of the oxide of the trivalent cerium.

3. A luminescent phosphate glass emissive in the yellow to red spectral range under irradiation by ultraviolet rays, said glass having the following composition:

| | Per cent |
|---|---|
| Phosphorus pentoxide ($P_2O_5$) | 56 to 70.5 |
| Boric oxide ($B_2O_3$) | 3 |
| Manganese oxide (MnO) | 2 to 8 |
| Cerium oxide ($Ce_2O_3$) | 1.5 to 8 |
| Arsenic oxide ($As_2O_5$) | 0.5 to 1.5 | and material from the group consisting of barium oxide (BaO), magnesium oxide (MgO), aluminum oxide ($Al_2O_3$) and potassium oxide ($K_2O$).

4. A luminescent phosphate glass emissive in the yellow to red spectral range under irradiation by ultraviolet rays, said glass having the following composition:

| | Per cent |
|---|---|
| Phosphorus pentoxide ($P_2O_5$) | 59.5 |
| Boric oxide ($B_2O_3$) | 3.0 |
| Barium oxide (BaO) | 24.0 |
| Manganese oxide (MnO) | 4.0 |
| Alumina ($Al_2O_3$) | 6.0 |
| Cerium oxide ($Ce_2O_3$) | 2.0 |
| Arsenic oxide ($As_2O_5$) | 1.5 |

5. A luminescent phosphate glass emissive in the yellow to red spectral range under irradiation by ultraviolet rays, said glass having the following composition:

| | Per cent |
|---|---|
| Phosphorus pentoxide ($P_2O_5$) | 56.0 |
| Boric oxide ($B_2O_3$) | 3.0 |
| Barium oxide (BaO) | 30.0 |
| Manganese oxide (MnO) | 8.0 |
| Cerium oxide ($Ce_2O_3$) | 1.5 |
| Arsenic oxide ($As_2O_5$) | 1.5 |

6. A luminescent phosphate glass emissive in the yellow to red spectral range under irradiation by ultraviolet rays, said glass having the following composition:

| | Per cent |
|---|---|
| Phosphorus pentoxide ($P_2O_5$) | 70.5 |
| Boric oxide ($B_2O_3$) | 3.0 |
| Potassium oxide ($K_2O$) | 12.0 |
| Magnesium oxide (MgO) | 2.0 |
| Manganese oxide (MnO) | 2.0 |
| Alumina ($Al_2O_3$) | 2.0 |
| Cerium oxide ($Ce_2O_3$) | 8.0 |
| Arsenic oxide ($As_2O_5$) | 0.5 |

MAGDALENE HÜNIGER.
HANS PANKE.